United States Patent
Palanki et al.

(10) Patent No.: US 8,908,595 B2
(45) Date of Patent: Dec. 9, 2014

(54) METHODS AND APPARATUS FOR ADJACENT CHANNEL INTERFERENCE MITIGATION IN ACCESS POINT BASE STATIONS

(75) Inventors: Ravi Palanki, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 484 days.

(21) Appl. No.: 12/722,396

(22) Filed: Mar. 11, 2010

(65) Prior Publication Data

US 2010/0234040 A1 Sep. 16, 2010

Related U.S. Application Data

(60) Provisional application No. 61/159,753, filed on Mar. 12, 2009.

(51) Int. Cl.
 *H04W 4/00* (2009.01)
 *H04W 52/24* (2009.01)
 *H04W 52/14* (2009.01)

(52) U.S. Cl.
 CPC .......... *H04W 52/244* (2013.01); *H04W 52/143* (2013.01)
 USPC .............................. 370/328; 370/252; 455/522

(58) Field of Classification Search
 None
 See application file for complete search history.

(56) References Cited

U.S. PATENT DOCUMENTS

| 5,864,549 A | 1/1999 | Honkasalo et al. |
| 2008/0084940 A1 | 4/2008 | Hou |
| 2008/0188265 A1* | 8/2008 | Carter et al. ................... 455/561 |
| 2009/0042532 A1 | 2/2009 | Bienas et al. |
| 2009/0042593 A1 | 2/2009 | Yavuz et al. |
| 2010/0202431 A1* | 8/2010 | Kazmi et al. ................... 370/342 |
| 2011/0003597 A1* | 1/2011 | Budic et al. ................... 455/450 |
| 2012/0028665 A1* | 2/2012 | Kwon et al. ................... 455/501 |

FOREIGN PATENT DOCUMENTS

| CN | 101018082 A | 8/2007 |
| WO | 2005062798 A2 | 7/2005 |
| WO | WO2005062798 A2 | 7/2005 |
| WO | 2008088253 A1 | 7/2008 |
| WO | WO2008088253 | 7/2008 |
| WO | 2009008805 A2 | 1/2009 |

OTHER PUBLICATIONS

"3rd Generation Partnership 1-79 Project;Technical Specification Group Radio Access Networks;3G Home NodeB Study Item Technical Report(Release 8)" 3GPP Draft; TR 25.820 VO.3.0, 3rd Generation Partnership Project (3GPP), Mobile Competence Centre ; 650, ROU.
International Search Report—PCT/US2010/027240—International Search Authority, European Patent Office, Aug. 19, 2010.

(Continued)

*Primary Examiner* — Mohammad Adhami
(74) *Attorney, Agent, or Firm* — Ashish L. Patel

(57) ABSTRACT

Apparatus and methods for interference mitigation in wireless communication networks are described. In one implementation, at a node in a first network, a power level and/or bandwidth or channelization of an adjacent channel signal may be determined, and a power level and/or bandwidth of a transmitted signal in the first network may be adjusted in response.

38 Claims, 11 Drawing Sheets

(56) References Cited

OTHER PUBLICATIONS

Vodafone et al: "HNB Radio Resource,63 Management Considerations" 3GPP Draft; R4-081595, 3rd Generation Partnership Project (3GPP), Mobile Competence Centre ; 650, Route Desluci0les ; F-06921 S0phia-Antip0lis Cedex; France,vol. RAN WG4, No. Munich, German.
3GPP TR 25.820, "3rd Generation Partnership Project; Technical Specification Group Radio Access Networks; 3G Home NodeB Study Item Technical Report (Release 8)" 3GPP Draft; TR 25.820 V0.3.0, 3rd Generation Partnership Project (3GPP), Mobile Competence Centre ; 650, Route Des Luci0les ; F-06921 S0phia-Antip0lis Cedex ; France, vol. RAN WG4, No. Jeju; Nov. 14, 2007, XP050178645 [retrieved on Nov. 14, 2007].
European Search Report—EP13157249—Search Authority—Munich—Apr. 4, 2013.
European Search Report—EP13157255—Search Authority—Munich—Apr. 4, 2013.
European Search Report—EP13157261—Search Authority—Munich—Apr. 4, 2013.
European Search Report—EP13157267—Search Authority—Munich—Apr. 4, 2013.
International Search Report and Written Opinion—PCT/US2010/027240—International Search Authority, European Patent Office, Aug. 19, 2010.
Vodafone et al., "HNB Radio Resource Management Considerations" 3GPP Draft; R4-081595, 3rd Generation Partnership Project (3GPP), Mobile Competence Centre ; 650, Route Des Luci0les ; F-06921 S0phia-Antip0lis Cedex ; France, vol. RAN WG4, No. Munich, Germany; Jun. 13, 2008, XP050180142 [retrieved on Jun. 13, 2008].
Taiwan Search Report—TW099107333—TIPO—Jun. 19, 2013.
Zhang H., "A new space-time-frequency MIMO-OFDM scheme with cyclic delay diversity", Frontiers of Mobile and Wireless Communication, 2004. Proceedings of the IEEE 6th Circuits and Systems Symposium on vol. 2, Jun. 2, 2004, pp. 647 to 650.

* cited by examiner

METHODS AND APPARATUS FOR ADJACENT CHANNEL INTERFERENCE MITIGATION IN ACCESS POINT BASE STATIONS

CROSS-REFERENCE TO RELATED APPLICATIONS

This application claims priority under 35 U.S.C. §119(e) to U.S. Provisional Patent Application Ser. No. 61/159,753, entitled METHOD AND APPARATUS FOR ADJACENT CHANNEL INTERFERENCE MITIGATION IN ACCESS POINT BASE STATIONS, filed on Mar. 12, 2009, the content of which is incorporated by reference herein in its entirety for all purposes.

BACKGROUND

1. Field

This application is directed generally to wireless communications systems. More particularly, but not exclusively, the present application is directed to methods and apparatus for interference mitigation in femtocells operating adjacent to other wireless networks.

2. Relevant Background

Wireless communication systems are widely deployed to provide various types of communication content such as voice, data, video and the like. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, third generation partnership project (3GPP) Long Term Evolution (LTE) systems, as well as other orthogonal frequency division multiple access (OFDMA) systems.

A wireless multiple-access communication system can simultaneously support communication for multiple wireless terminals, which are also known as mobiles, user equipment or UEs. Each terminal communicates with one or more base stations via transmissions on forward and reverse links. The forward link (also known as a downlink) refers to the communication link from the base stations to the terminals, and the reverse link (also know as an uplink) refers to the communication link from the terminals to the base stations. These communication links may be established via systems including single-in-single-out, single-in-multiple-out, multiple-in-single-out or multiple-in-multiple-out (MIMO) systems.

In addition to the mobile phone networks currently in place, a new class of small base stations has emerged. These may be installed in a more local environment, such as a user's home or office environment to provide indoor wireless coverage to UEs in conjunction with existing broadband Internet connections. These miniature base stations are generally known as access point base stations or alternatively as Home Node Bs (HNBs), Home evolved Node Bs (HeNBs), or femtocells. Typically, these miniature base stations are connected to the Internet and the mobile operator's network via broadband connections such as DSL, router or cable modem.

These miniature base stations may be deployed by users in homes, offices or other buildings or local areas, and may be subject to interference from other femtocells, picocells, macrocells and/or other wireless networks. They may also create interference in these other networks. Accordingly, there is a need in the art for methods and apparatus for interference mitigation between these wireless networks.

SUMMARY

The disclosure relates generally to apparatus and methods for mitigating interference in wireless networks. In one implementation using access point base stations or HeNBs, the presence of other networks may be detected and one or more transmission parameters, such as bandwidth and power level, may be adjusted. By implementing such adjustments, interference levels between the networks may be maintained within acceptable limits.

In one aspect, a method for minimizing adjacent channel interference includes sensing, at a node of a wireless network, a received signal power on one or more of a plurality of adjacent channels and responsively determining whether the adjacent channels are used by an adjacent wireless network of a first network type or by an adjacent wireless network of a second network type, and adjusting, in response to the received signal power, an output power transmitted by the node to minimize an interference level on the adjacent channels.

In another aspect, a method for minimizing adjacent channel interference includes determining, at a node of a wireless network, a power level of at least one signal received on at least one channel of a plurality of adjacent channels, wherein the plurality of adjacent channels are used by an adjacent wireless network of a first network type or by an adjacent wireless network of a second network type and adjusting, responsive to the determined power level, an output power of the node.

In another aspect, a femto node includes a signal power determiner configured to determine a power level of at least one signal received on at least one channel of a plurality of adjacent channels, wherein the plurality of adjacent channels are used by an adjacent wireless network of a first network type or by an adjacent wireless network of a second network type and a transmit power controller configured to adjust, responsive to the determined power level, an output power of the femto node.

In another aspect, a computer program product comprising a computer-readable medium includes codes for causing a computer to determine, at a node of a wireless network, a power level of at least one signal received on at least one channel of a plurality of adjacent channels, wherein the plurality of adjacent channels are used by an adjacent wireless network of a first network type or by an adjacent wireless network of a second network type and adjust, responsive to the determined power level, an output power of the node.

In another aspect, a method for interference mitigation includes determining that a first plurality of subcarriers within a first carrier bandwidth are used for carrying a first set of uplink control channels to a macrocell node and allocating a second plurality of subcarriers within a second carrier bandwidth for use in carrying a second set of uplink control channels to a femtocell node wherein the first plurality of subcarriers and second plurality of subcarriers are orthogonal.

In another aspect, a method for interference mitigation includes determining, at a node of a first wireless communication system, a received signal power level transmitted by one or more nodes of a second wireless communication system and adjusting, in response to the determined power level, bandwidth of a signal transmitted by the node.

In another aspect, a method includes receiving, from a macrocell node, a first plurality of subcarrier signals, receiving, from the macrocell node, a second plurality of subcarrier signals wherein the second plurality of subcarriers are included within a bandwidth shared with a femtocell node and weighting a first plurality of modulation symbols carried by the first plurality of subcarrier signals differently relative to a second plurality of modulation symbols carried by the second plurality of subcarrier signals.

In another aspect, an apparatus for use in a communications device includes a memory and a processor coupled to the memory, the processor configured to execute instructions stored in the memory to determine, at a node of a wireless network, a power level of at least one signal received on at least one channel of a plurality of adjacent channels, wherein the plurality of adjacent channels are used by an adjacent wireless network of a first network type or by an adjacent wireless network of a second network type and adjust, responsive to the determined power level, an output power of the node.

In another aspect, a femto node includes a signal power determiner configured to determine that a first plurality of subcarriers within a first carrier bandwidth are used for carrying a first set of uplink control channels to a macrocell node and a transmit power controller configured to allocate a second plurality of subcarriers within a second carrier bandwidth for use in carrying a second set of uplink control channels to a femtocell node wherein the first plurality of subcarriers and second plurality of subcarriers are orthogonal.

In another aspect, a computer program product comprising a computer-readable medium including codes for causing a computer to determine that a first plurality of subcarriers within a first carrier bandwidth are used for carrying a first set of uplink control channels to a macrocell node and allocate a second plurality of subcarriers within a second carrier bandwidth for use in carrying a second set of uplink control channels to a femtocell node wherein the first plurality of subcarriers and second plurality of subcarriers are orthogonal.

In another aspect, a femto node includes a signal power determiner configured to determine, at a node of a first wireless communication system, a received signal power level transmitted by one or more nodes of a second wireless communication system and adjusting, in response to the power level, bandwidth of a signal transmitted by the node.

In another aspect, a computer program product comprising a computer-readable medium including codes for causing a computer to determine, at a node of a first wireless communication system, a received signal power level transmitted by one or more nodes of a second wireless communication system and adjust, in response to the power level, bandwidth of a signal transmitted by the node.

In another aspect, a femto node includes a signal power determiner configured to determine, at a femtocell node, a predefined signal transmitted by a macrocell node and adjust, in response to the determining of the predefined signal, bandwidth of a signal transmitted by the femtocell node.

In another aspect, a femto node includes a signal power determiner configured to receive, from a macrocell node, a first plurality of subcarrier signals, receive, from the macrocell node, a second plurality of subcarrier signals wherein the second plurality of subcarriers are included within a bandwidth shared with a femtocell node and weigh a first plurality of modulation symbols carried by the first plurality of subcarrier signals differently relative to a second plurality of modulation symbols carried by the second plurality of subcarrier signals.

In another aspect, a computer program product comprising a computer-readable medium including codes for causing a computer to receive, from a macrocell node, a first plurality of subcarrier signals, receive, from the macrocell node, a second plurality of subcarrier signals wherein the second plurality of subcarriers are included within a bandwidth shared with a femtocell node and weigh a first plurality of modulation symbols carried by the first plurality of subcarrier signals differently relative to a second plurality of modulation symbols carried by the second plurality of subcarrier signals.

Additional aspects of embodiments presented herein are further described below in conjunction with the appended drawings.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
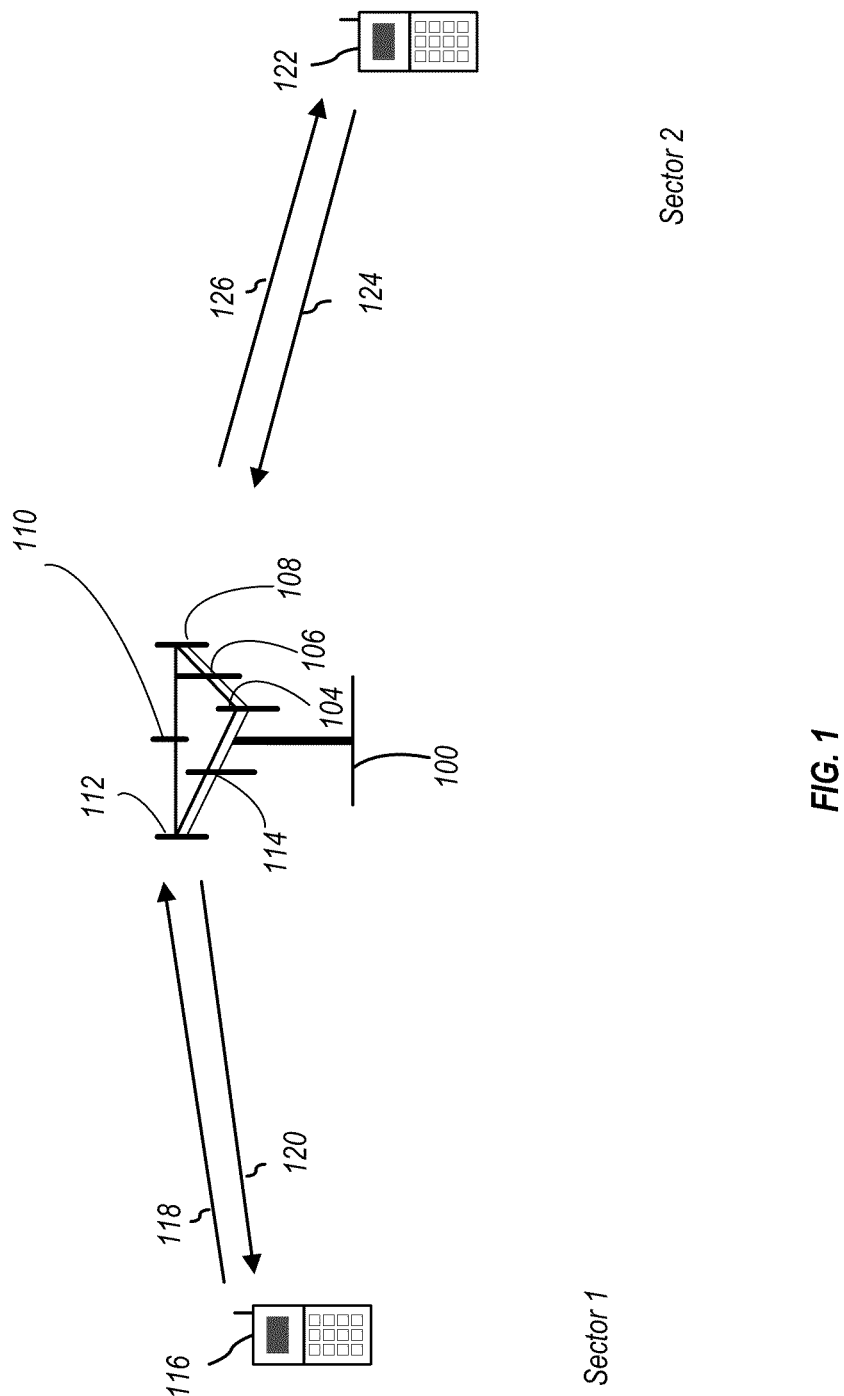
FIG. 1 illustrates a multiple access wireless communications system.

The disclosure relates generally to apparatus and methods for mitigating interference in wireless networks. Various aspects of embodiments are described below. It should be apparent that the teachings herein may be implemented in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or in place of one or more of the aspects set forth herein. Furthermore, an aspect may comprise at least one element of a claim. Various embodiments may be implemented in the form of processes and methods, apparatus and devices, systems, and/or computer-readable media.

In one implementation using access point base stations or HeNBs, the presence of other networks may be detected and one or more transmission parameters, such as bandwidth, channelization and/or power level, may be adjusted. By implementing such adjustments, interference levels between the networks may be maintained within acceptable limits.

In another aspect, a method for minimizing adjacent channel interference includes sensing, at a node of a wireless network, a received signal power on one or more of a plurality of adjacent channels and responsively determining whether the adjacent channels are used by an adjacent wireless network of a first network type or by an adjacent wireless network of a second network type, and adjusting, in response to the received signal power, an output power transmitted by the node to minimize an interference level on the adjacent channels.

In another aspect, a method for minimizing adjacent channel interference includes determining, at a node of a wireless network, a power level of at least one signal received on at least one channel of a plurality of adjacent channels, wherein the plurality of adjacent channels are used by an adjacent wireless network of a first network type or by an adjacent wireless network of a second network type and adjusting, responsive to the determined power level, an output power of the node.

In another aspect, a femto node includes a signal power determiner configured to determine a power level of at least one signal received on at least one channel of a plurality of adjacent channels, wherein the plurality of adjacent channels are used by an adjacent wireless network of a first network type or by an adjacent wireless network of a second network type and a transmit power controller configured to adjust, responsive to the determined power level, an output power of the femto node.

In another aspect, a computer program product comprising a computer-readable medium includes codes for causing a computer to determine, at a node of a wireless network, a power level of at least one signal received on at least one channel of a plurality of adjacent channels, wherein the plurality of adjacent channels are used by an adjacent wireless network of a first network type or by an adjacent wireless network of a second network type and adjust, responsive to the determined power level, an output power of the node.

In another aspect, a method for interference mitigation includes determining that a first plurality of subcarriers within a first carrier bandwidth are used for carrying a first set of uplink control channels to a macrocell node and allocating a second plurality of subcarriers within a second carrier bandwidth for use in carrying a second set of uplink control channels to a femtocell node wherein the first plurality of subcarriers and second plurality of subcarriers are orthogonal.

In another aspect, a method for interference mitigation includes determining, at a node of a first wireless communication system, a received signal power level transmitted by one or more nodes of a second wireless communication system and adjusting, in response to the determined power level, bandwidth of a signal transmitted by the node.

In another aspect, a method includes receiving, from a macrocell node, a first plurality of subcarrier signals, receiving, from the macrocell node, a second plurality of subcarrier signals wherein the second plurality of subcarriers are included within a bandwidth shared with a femtocell node and weighting a first plurality of modulation symbols carried by the first plurality of subcarrier signals differently relative to a second plurality of modulation symbols carried by the second plurality of subcarrier signals.

In another aspect, an apparatus for use in a communications device includes a memory and a processor coupled to the memory, the processor configured to execute instructions stored in the memory to determine, at a node of a wireless network, a power level of at least one signal received on at least one channel of a plurality of adjacent channels, wherein the plurality of adjacent channels are used by an adjacent wireless network of a first network type or by an adjacent wireless network of a second network type and adjust, responsive to the determined power level, an output power of the node.

In another aspect, a femto node includes a signal power determiner configured to determine that a first plurality of subcarriers within a first carrier bandwidth are used for carrying a first set of uplink control channels to a macrocell node and a transmit power controller configured to allocate a second plurality of subcarriers within a second carrier bandwidth for use in carrying a second set of uplink control channels to a femtocell node wherein the first plurality of subcarriers and second plurality of subcarriers are orthogonal.

In another aspect, a computer program product comprising a computer-readable medium including codes for causing a computer to determine that a first plurality of subcarriers within a first carrier bandwidth are used for carrying a first set of uplink control channels to a macrocell node and allocate a second plurality of subcarriers within a second carrier bandwidth for use in carrying a second set of uplink control channels to a femtocell node wherein the first plurality of subcarriers and second plurality of subcarriers are orthogonal.

In another aspect, a femto node includes a signal power determiner configured to determine, at a node of a first wireless communication system, a received signal power level transmitted by one or more nodes of a second wireless communication system and adjusting, in response to the power level, bandwidth of a signal transmitted by the node.

In another aspect, a computer program product comprising a computer-readable medium including codes for causing a computer to determine, at a node of a first wireless communication system, a received signal power level transmitted by one or more nodes of a second wireless communication system and adjust, in response to the power level, bandwidth of a signal transmitted by the node.

In another aspect, a femto node includes a signal power determiner configured to determine, at a femtocell node, a predefined signal transmitted by a macrocell node and adjust, in response to the determining of the predefined signal, bandwidth of a signal transmitted by the femtocell node.

In another aspect, a femto node includes a signal power determiner configured to receive, from a macrocell node, a first plurality of subcarrier signals, receive, from the macrocell node, a second plurality of subcarrier signals wherein the second plurality of subcarriers are included within a bandwidth shared with a femtocell node and weigh a first plurality of modulation symbols carried by the first plurality of subcarrier signals differently relative to a second plurality of modulation symbols carried by the second plurality of subcarrier signals.

In another aspect, a computer program product comprising a computer-readable medium including codes for causing a computer to receive, from a macrocell node, a first plurality of subcarrier signals, receive, from the macrocell node, a second plurality of subcarrier signals wherein the second plurality of subcarriers are included within a bandwidth shared with a femtocell node and weigh a first plurality of modulation symbols carried by the first plurality of subcarrier signals differently relative to a second plurality of modulation symbols carried by the second plurality of subcarrier signals.

In the description herein, a node that provides coverage over a relatively large area may be referred to as a macro node, while a node that provides coverage over a relatively small area (e.g., a residence or office) may be referred to as a femto node. Likewise, a cell covering a relatively large area may be referred to as a macrocell, whereas a cell covering a relatively small area may be referred to as a femtocell.

While the embodiments herein are generally described in the context of femtocells and femto nodes, it should be appreciated that the teachings herein may be applicable to nodes associated with other types of coverage areas. For example, a piconode may provide coverage over an area that is smaller than a macro area and larger than a femto area (e.g., coverage within a commercial building or similar area). Moreover, in various applications, other terminology may be used to reference a macro node, a femto node, or other access point-type nodes. For example, a macronode may be configured as and/or referred to as an access node, base station, access point, eNodeB, macro cell, and so on. Also, a femto node may be configured or referred to as a Home NodeB, Home eNodeB, access point base station, femtocell, and so on. In some implementations, a node may be associated with (e.g., divided into) one or more cells or sectors. A cell or sector associated with a macronode, a femto node, or a piconode may be referred to as a macrocell, a femtocell, or a picocell, respectively. In some implementations, each cell may be further associated with (e.g., divided into) one or more sectors.

In various embodiments, the techniques and apparatus described herein may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks as well as other communications networks. As described herein, the terms "networks" and "systems" may be used interchangeably.

A CDMA network may implement a radio technology such as Universal Terrestrial Radio Access (UTRA), cdma2000 and the like. UTRA includes Wideband-CDMA (WCDMA) and Low Chip Rate (LCR). Cdma2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is an upcoming release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed in the art.

For clarity, certain aspects of the apparatus and techniques are described below for LTE, and LTE terminology is used in much of the description below; however, the description and associated applications are not intended to be limited to LTE applications. Accordingly, it will be apparent to one of skill in the art that the apparatus and methods described herein may be applied to various other communications systems and applications.

Orthogonal frequency division multiple access (OFDMA) using multiple orthogonal subcarriers, which is used in, for example, the LTE downlink, is one communications technique of interest. Single carrier frequency division multiple access (SC-FDMA), which is used in, for example, the LTE uplink and which utilizes single carrier modulation and frequency domain equalization, is another communications technique of interest. SC-FDMA implementations have similar performance and essentially the same overall complexity as OFDMA; however, an SC-FDMA signal has lower peak-to-average power ratio (PAPR) because of its inherent single carrier structure. As a result, SC-FDMA has drawn great attention recently, especially for uplink communications where lower PAPR greatly benefits the mobile terminal in terms of transmit power efficiency. Use of SC-FDMA is currently a working assumption for uplink multiple access schemes in 3GPP Long Term Evolution (LTE), or E-UTRA.

Logical channels in wireless communications systems may be classified into Control Channels and Traffic Channels. Logical Control Channels may comprise a Broadcast Control Channel (BCCH) which is a downlink (DL) channel for broadcasting system control information, a Paging Control Channel (PCCH) which is a DL channel that transfers paging information and a Multicast Control Channel (MCCH) which is a Point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS. A Dedicated Control Channel (DCCH) is a Point-to-point bi-directional channel that transmits dedicated control information and is used by UEs having an RRC connection.

Logical Traffic Channels may comprise a Dedicated Traffic Channel (DTCH) which is Point-to-point bi-directional channel, dedicated to one UE, for the transfer of user information, and a Multicast Traffic Channel (MTCH) for Point-to-multipoint DL channel for transmitting traffic data.

Transport Channels may be classified into Downlink (DL) and Uplink (UL). DL Transport Channels comprises a Broadcast Channel (BCH), Downlink Shared Data Channel (DL-SDCH) and a Paging Channel (PCH). The PCH may be used for support of UE power saving (when a DRX cycle is indicated by the network to the UE), broadcast over an entire cell and mapped to PHY resources which can be used for other control/traffic channels. The UL Transport Channels may comprise a Random Access Channel (RACH), a Request Channel (REQCH), an Uplink Shared Data Channel (UL-SDCH) and a plurality of PHY channels. The PHY channels may comprise a set of DL channels and UL channels.

In addition, the DL PHY channels may comprise the following:
  Common Pilot Channel (CPICH)
  Synchronization Channel (SCH)
  Common Control Channel (CCCH)
  Shared DL Control Channel (SDCCH)
  Multicast Control Channel (MCCH)
  Shared UL Assignment Channel (SUACH)
  Acknowledgement Channel (ACKCH)
  DL Physical Shared Data Channel (DL-PSDCH)
  UL Power Control Channel (UPCCH)
  Paging Indicator Channel (PICH)
  Load Indicator Channel (LICH)
  The UL PHY Channels may comprise the following:
  Physical Random Access Channel (PRACH)
  Channel Quality Indicator Channel (CQICH)
  Acknowledgement Channel (ACKCH)

Antenna Subset Indicator Channel (ASICH)
Shared Request Channel (SREQCH)
UL Physical Shared Data Channel (UL-PSDCH)
Broadband Pilot Channel (BPICH)

For purposes of explanation of various embodiments, the following terminology and abbreviations may be used herein:

3G Third Generation of Wireless Cellular Standards
4G Fourth Generation of Wireless Cellular Standards
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multmedia Broadcast Multicast Service
MCCHMBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multicast broadcast single frequency network
MCE MBMS coordinating entity
MCH Multicast channel
DL-SCH Downlink shared channel
MSCH MBMS control channel
PDCCH Physical downlink control channel
PDSCH Physical downlink shared channel A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels. The maximum spatial multiplexing $N_S$ if a linear receiver is used is min($N_T$, $N_R$), with each of the $N_S$ independent channels corresponding to a dimension. This provides an $N_S$ increase in spectral efficiency. A MIMO system can provide improved performance (e.g., higher throughput and/or greater reliability) if the additional dimensionalities created by the multiple transmit and receive antennas are utilized. The special dimension may be described in terms of a rank.

MIMO systems support time division duplex (TDD) and frequency division duplex (FDD) implementations. In a TDD system, the forward and reverse link transmissions use the same frequency regions so that the reciprocity principle allows the estimation of the forward link channel from the reverse link channel. This enables the access point to extract transmit beamforming gain on the forward link when multiple antennas are available at the access point.

The term "exemplary" is used herein to mean "serving as an example, instance, or illustration." Any embodiment described herein as "exemplary" is not necessarily to be construed as preferred or advantageous over other embodiments.

Attention is now directed to FIG. 1, which illustrates a multiple access wireless communication system. In various implementations, an access point, such as HeNB or AP 100 of FIG. 1, may be a fixed station used for communicating with access terminals and may be referred to as an access point, eNodeB, HeNB or by other terminology. A user equipment or access terminal, such as UE or AT 100 of FIG. 1, may be denoted as an access terminal, user equipment (UE), a wireless communication device, terminal, access terminal or by other terminology. As shown in FIG. 1, an evolved Node B (eNodeB) or access point (AP) 100 may include multiple antenna groups, with one group including antennas 104 and 106, another including antennas 108 and 110, and an additional group including antennas 112 and 114. In FIG. 1, only two antennas are shown for each antenna group; however, more or fewer antennas may be utilized for each antenna group in various embodiments.

A UE or Access terminal (AT) 116 is in communication with antennas 112 and 114, where antennas 112 and 114 transmit information to UE 116 over forward link 120 and receive information from UE 116 over reverse link 118. UE 122 is in communication with antennas 106 and 108, where antennas 106 and 108 transmit information to UE 122 over forward link 126 and receive information from UE 122 over reverse link 124. In a frequency division duplex (FDD) system, communication links 118, 120, 124 and 126 may use different frequencies for communication between HeNB 100 and UEs 116 and 122. For example, forward link 120 may use a different frequency than that used by reverse link 118. Likewise, links 124 and 126 may use different frequencies than each other and/or than links 118 and 120.

Each group of antennas and/or the area in which they are designed to communicate may be referred to as a sector of the HeNB or AP. In the illustrated embodiment, antenna groups are each designed and configured to communicate with access terminals in a designated sector of the area covered by HeNB 100. For example, the antenna group including antennas 112 and 114 may be assigned to a sector designated as Sector 1 in FIG. 1, while the antenna group including antennas 106 and 108 may be assigned to Sector 2.

In communication over forward links 120 and 126, the transmitting antennas of HeNB 100 may be configured to utilize beamforming in order to improve the signal-to-noise ratio of forward links for the different UEs 116 and 122, as well as others (not shown). Also, in typical implementations, an HeNB or AP using beamforming to transmit to UEs scattered randomly throughout its coverage area will generally cause less interference to UEs or access terminals in neighboring cells than an HeNB or AP transmitting through a single antenna to all its UEs or ATs. In a typical embodiment, HeNB 100 and UE 250 are configured to process fourth generation or 4G signaling and associated data, such as are defined for LTE implementations.

Figure 2:
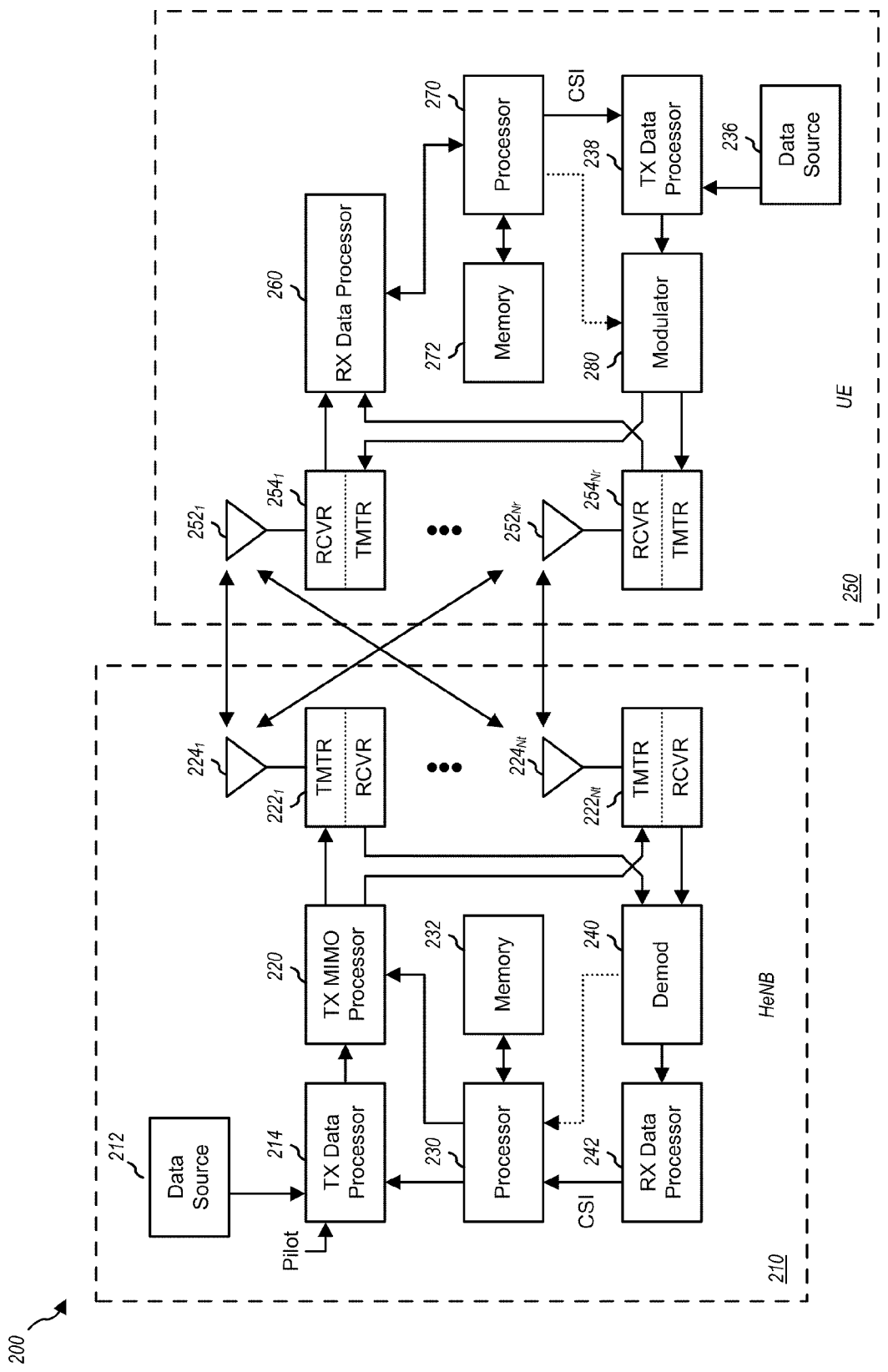
FIG. 2 is a block diagram of an example HeNB and UE configuration.

Attention is now directed to FIG. 2, which illustrates a block diagram of an embodiment of a base station or transmitter node 210 (i.e., an AP, eNB or HeNB) and a receiver system or user terminal 250 (i.e., an AT or UE) in an example MIMO system 200. These systems may correspond to HeNB 100 and UEs 116 and 122 of FIG. 1.

In operation, at the transmitter system 210, traffic data for a number of data streams may be provided from a data source 212 to a transmit (TX) data processor 214, where it may be processed and transmitted to one or more receiver systems 250.

In one embodiment, each data stream is processed and transmitted over a respective transmitter sub-system (shown as transmitters $224_1$-$224_{N_T}$) of transmit system 210. TX data processor 214 receives, formats, codes, and interleaves the traffic data for each data stream based on a particular coding scheme selected for that data stream so as to provide coded data. In particular, transmit system 210 may be configured to determine a particular reference signal and reference signal pattern and provide a transmit signal including the reference signal in the selected pattern.

The coded data for each data stream may be multiplexed with pilot data using OFDM techniques. The pilot data is typically a known data pattern that is processed in a known manner and may be used at the receiver system to estimate the channel response. For example, the pilot data may comprise a reference signal. Pilot data may be provided to TX data processor 214 as shown in FIG. 2 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.) selected for that data stream so as to provide modulation symbols. The data rate, coding, and modulation for each data stream may be determined by instructions performed by processor 230 based on instructions stored in memory 232, or in other memory or instruction storage media of transmit system 250 (not shown). In addition, processor 230 may perform power level and bandwidth determination and/or adjustment based on characteristics of adjacent channels as is further described below. This may be done in conjunction with instructions stored in memory 232 and/or in other memory or computer program storage devices. Alternately, power and bandwidth processing as is further described below may be performed in other elements of node 210 (not shown in FIG. 2). These elements and associated functionality may be alternately denoted herein as a determiner or determiner module.

The modulation symbols for all data streams may then be provided to a TX MIMO processor 220, which may further process the modulation symbols (e.g., for OFDM implementation). TX MIMO processor 220 may then provide $N_T$ modulation symbol streams to $N_T$ transmitters (TMTR) $222_1$ through $222_{N_T}$. The various symbols may be mapped to associated RBs for transmission.

In certain embodiments, TX MIMO processor 220 may apply beamforming weights to the symbols of the data streams and to the antenna from which the symbol is being transmitted. This may be done by using information such as channel estimation information provided by or in conjunction with the reference signals.

Each transmitter sub-system $222_1$ through $222_{N_T}$ receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters $222_1$ through $222_{N_T}$ are then transmitted from $N_T$ antennas $224_1$ through $224_{N_T}$, respectively. Received signal processing may be performed by elements of HeNB 210, such as processors 230 and 242, memory 232 and/or other elements (not shown) configured as a signal power determiner module to determine received signal power levels, which may be based on received signal metrics. In addition, transmit output power control may be implemented in HeNB 210. This may be done using processors 220 and 230, memory 232 and/or in other elements (not shown) configured as a transmit output power controller module to set output power level of HeNB 210.

At receiver system 250, the transmitted modulated signals are received by $N_R$ antennas $252_1$ through $252 N_R$ and the received signal from each antenna $252_1$ through $252 N_R$ is provided to a respective receiver (RCVR) $254_1$ through $252 N_R$. Each receiver $254_1$ through $254 N_R$ conditions (e.g., filters, amplifies and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers $254_1$ through $252 N_R$ based on a particular receiver processing technique so as to provide $N_T$ "detected" symbol streams. The RX data processor 260 then demodulates, deinterleaves, and decodes each detected symbol stream to recover the traffic data for the data stream. The processing by RX data processor 260 is typically complementary to that performed by TX MIMO processor 220 and TX data processor 214 in transmitter system 210. A processor 270 may periodically determine a precoding matrix for use as is described further below. Processor 270 may then formulate a reverse link message that may comprise a matrix index portion and a rank value portion. In various embodiments, the reverse link message may comprise various types of information regarding the communication link and/or the received data stream. The reverse link message may then be processed by a TX data processor 238, which may also receive traffic data for a number of data streams from a data source 236 which may then be modulated by a modulator 280, conditioned by transmitters $254_1$ through $254 N_R$, and transmitted back to transmitter system 210. The transmit signal power and/or bandwidth (either at the HeNB, UE or both) may be adjusted as further described below.

At transmitter system 210, the modulated signals from receiver system 250 are received by antennas 224, conditioned by receivers 222, demodulated by a demodulator 240, and processed by an RX data processor 242 to extract the reserve link message transmitted by the receiver system 250. Processor 230 then determines which pre-coding matrix to use for determining beamforming weights, and then processes the extracted message. In addition, transmitter system 210 may include functionality, which may be implemented in processor 230, memory 232, receivers 222, demodulator 240, RX Data Processor 242 and/or other components (not shown) to receive, demodulate and process additional signals, such as third generation or 3G signals and associated data, such as WCDMA signals.

A simplified example of how femto nodes may be deployed in a communications network will now be described with reference to FIGS. 3 and 4.

Figure 3:
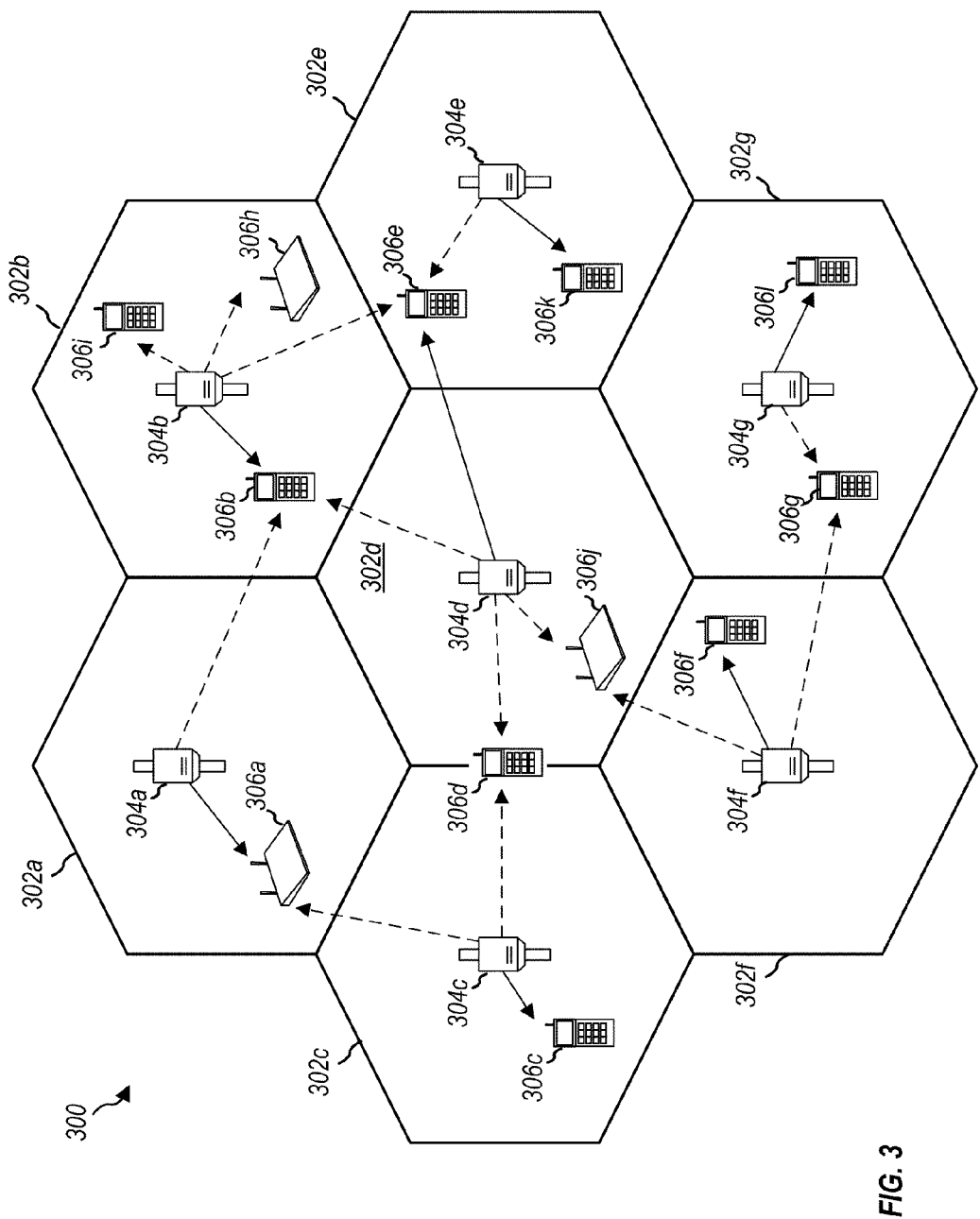
FIG. 3 illustrates a communications system to enable deployment of access point base stations within a network environment.

FIG. 3 illustrates an exemplary wireless communication system 300 configured to support a number of users, in which various disclosed embodiments and aspects may be implemented. As shown in FIG. 3, by way of example, system 300 provides communication for multiple cells 302 such as, for example, macro cells 302a-302g, with each cell being serviced by a corresponding HeNB or access point or APs 304, such as, for example, HeNBs 304a-304g. Each macro cell may be further divided into one or more sectors (not shown). As further shown in FIG. 3, various UE or AT devices 306, including ATs 306a-306l, also known interchangeably as user equipment (UE), mobile stations (MS), or as terminal devices, may be dispersed at various locations throughout the system. Each AT or UE 306 may communicate with one or more AP or HeNBs 304 on a forward link (FL) and/or a reverse link (RL) at a given moment, depending upon whether the UE or AT is active and whether it is in soft handoff, for example. The wireless communication system 300 may provide service over a large geographic region. For example, macro cells 302a-302g may cover only a few blocks within a neighborhood or several square miles in a rural environment. In some implementations, a relay element (not shown) may also be used to relay or transfer signals from an AT or UE to a femtocell node, macrocell node, picocell node, microcell node or other network node. In typical implementations, femtocells may be operated in areas adjacent to or overlapping with macrocells or other cells as shown in FIG. 3.

Figure 4:
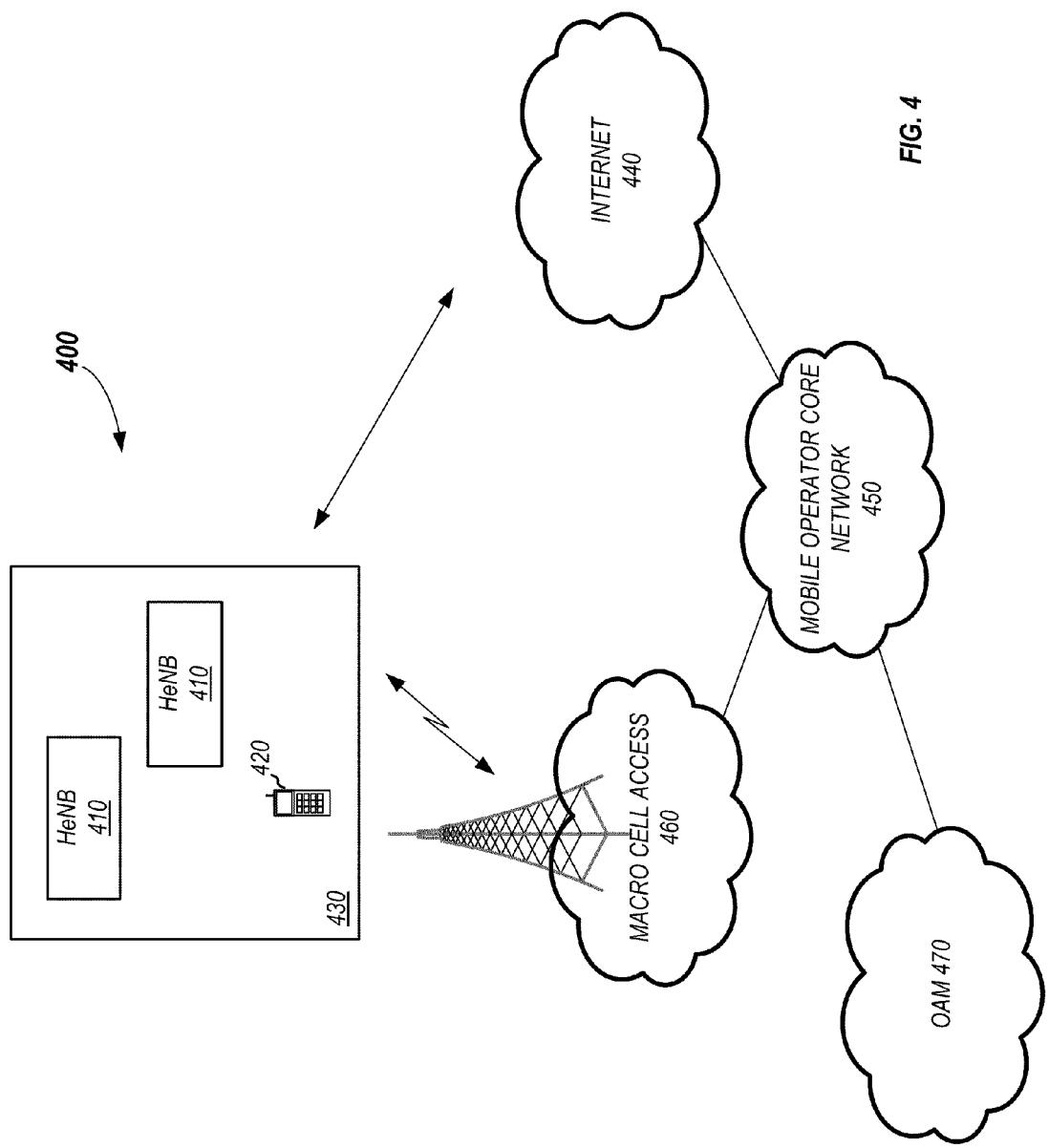
FIG. 4 illustrates use of femtocells in a wireless communications system.

Attention is now directed to FIG. 4, which illustrates an exemplary communication system to enable deployment of femtocells within a network environment. As shown in FIG. 4, system 400 includes multiple access point base stations or, in the alternative, femto nodes, Home Node B units (HNBs), or Home evolved Node B units (HeNBs). For example, as shown in FIG. 4, one or more HeNBs 410 may be installed in a corresponding small scale network environment, such as, for example, in one or more user residences or offices 430, and be configured to serve associated, as well as alien, UEs 420 or other mobile stations. Each HeNB 410 may further be coupled to the Internet 440 and a mobile operator core network 450 via a DSL router (not shown), via a cable modem (not shown), or via other connections (not shown).

In addition, each HeNB 410 may be coupled to and further configured to communicate via a wide area network, such as the Internet 440, and to any node on the Internet, including a macro mobile operator core network 450 (also referred to as a "core network"). The mobile operator, also denoted herein as a carrier or telco provider, may have additional resources and facilities, such as an HEMS in an operation, administration and maintainance (OAM) facility 470.

The HeNBs 410 may also be in proximity to one or more adjacent macrocells 460, which may be a macro cell 302a-g as shown in FIG. 3.

Home eNodeBs (HeNBs) or femto nodes are a useful mechanism of improving coverage and capacity in LTE networks by extending network reach into locations such as homes, offices, buildings or other areas. HeNBs may be particularly useful for creating coverage and/or capacity in small areas and for providing indoor coverage, and HeNBs can support open and closed subscriber groups. However, HeNBs may be operated in an environment shared with other networks. Moreover, HeNBs may be deployed in femtocells in a less controlled fashion than deployments in other cells such as macrocells, which are typically installed in conjunction with detailed planning by a carrier.

Figure 5:
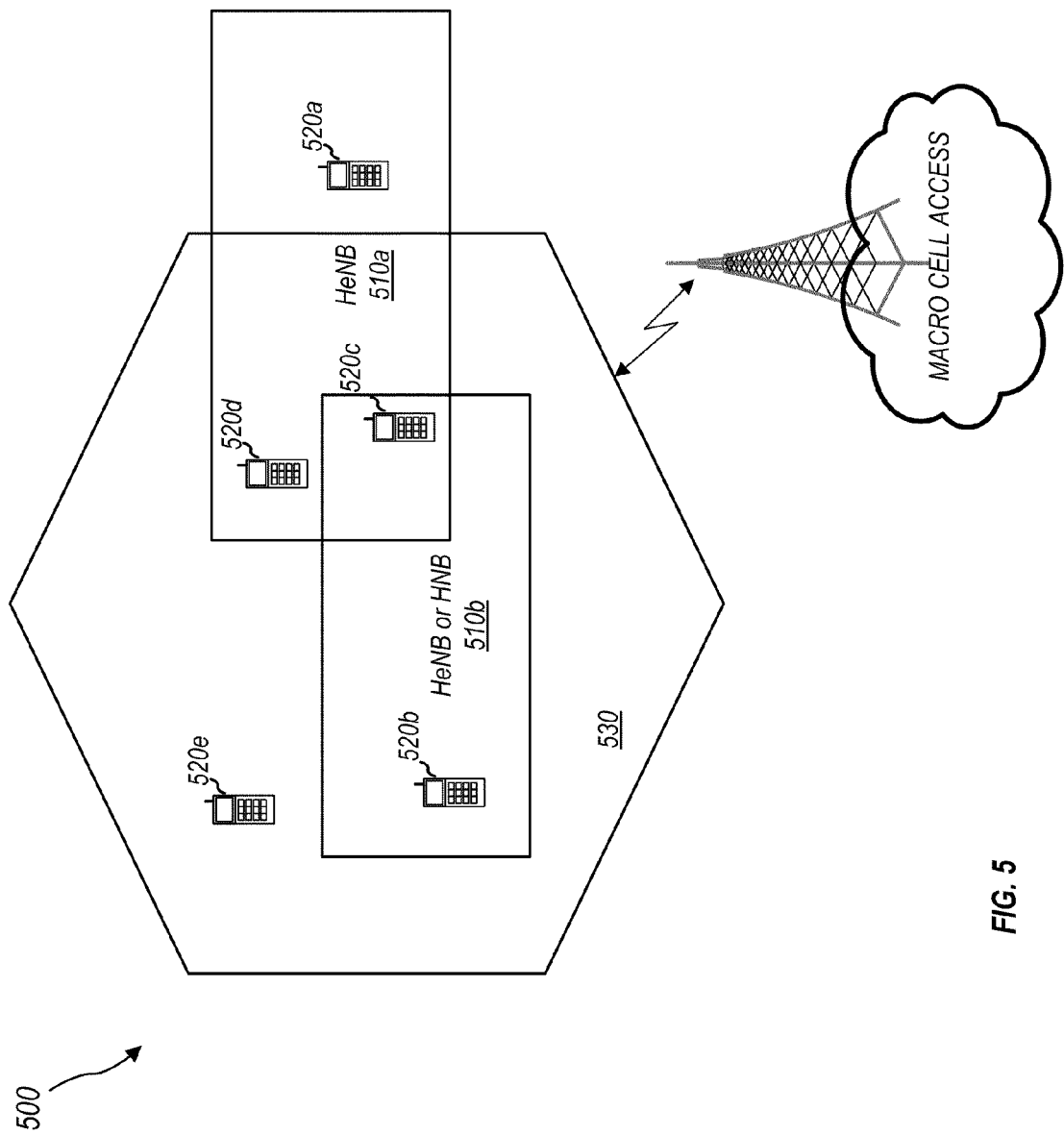
FIG. 5 illustrates an example interference environment with adjacent channels in a wireless communications system.

For example, FIG. 5 illustrates an example interference environment associated with one configuration of a communications system including multiple nodes and corresponding cells and AT or UEs 520a-520e. As shown in FIG. 5, an HeNB 510 may be adjacent to other HeNBs, HNBs, macrocells 530, and/or other cells or networks and associated network devices. In a typical configuration, the HeNBs will be adjacent to at least one macrocell network. However, the HeNBs may be installed in a residence or office in an unplanned fashion. Since HeNBs are generally implemented in licensed spectrum owned or licensed/controlled by a particular carrier, the HeNB may be operating adjacent to macrocell networks operated by one or more other carriers that may have separately own or have licensed the spectrum they are using, which may lead to minimal ability or interest in accepting interference to their networks. However, these various adjacent networks may interact so as to create interference with each other. As used herein, the term "adjacent" refers to networks, nodes, cells, etc. that may be physically near to each other, may overlap in coverage or interference in whole or part or are otherwise in proximity to or overlap each other.

In definition and operation, HeNBs have known differences with macro eNBs. For example, HeNBs generally have lower power, may use a consumer backhaul, may be autonomously deployed in an unplanned manner and may make use of Closed Subscriber Groups (CSG), thus restricting some UEs from accessing them. HeNBs and macro eNBs may have other differences as well. In addition, the radio propagation conditions may be different from those of macro eNBs.

Some such differences have been considered previously in the context of Home NodeBs (HNBs), and several techniques have been proposed to address these issues. Some of these techniques may be applicable to HeNBs as well. However, for HeNBs, there are differences from HNBs that may be utilized in alternate and/or additional interference mitigation implementations.

In one aspect, the nature of signaling used in HeNBs is different. In OFDMA, multiple subcarriers are used, which allows for adjustment of power level and/or sub-carrier channel selection in order to mitigate adjacent channel interference. In order to do this, a node in a wireless network, such as a eNB or HeNB, may sense a received signal power level on one or more adjacent channels and adjust the output power level transmitted by the node and/or by a UE in communication with the node, in response. The adjacent channels may be operated in a network or networks of different types (such as UTRA, cdma2000, GSM, etc), and in some implementations, the adjustment may be based on the particular network type or types as well as the power level and/or bandwidth. In particular, in one embodiment, an HeNB may be configured to measure both adjacent channel 3G and 4G network channels and set a power level accordingly. In a typical implementation, an HeNB includes a 3G receiver, such as, for example, a WCDMA or other 3G receiver.

Although embodiments described herein are generally described with respect to 3GPP terminology, it is to be understood that the embodiments described herein may be applied not only to 3GPP (Rel99, Rel5, Rel6, Rel7, Rel8, Rel9, etc.) technology, but also to 3GPP2 (1xRTT, 1xEV-DO Rel0, RevA, RevB, etc.) technology, as well as to other known and/or related technologies. In such embodiments described herein, the proprietor of an HNB, such as HNB 410 (as shown in FIG. 4) might subscribe to mobile services such as, for example, 3G mobile services, offered through the macro mobile operator core network 450, and the UE 420 might be capable of operating both in a macro cellular environment and in an HNB-based small coverage network environment. Thus, the HNB 410 might be adapted for backward compatibility with any existing UE 420.

In some implementations a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. A reciprocity principle may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from the base station, access point or eNodeB to the access terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, HIPERLAN-2, DVB and DAB.

Figure 6:
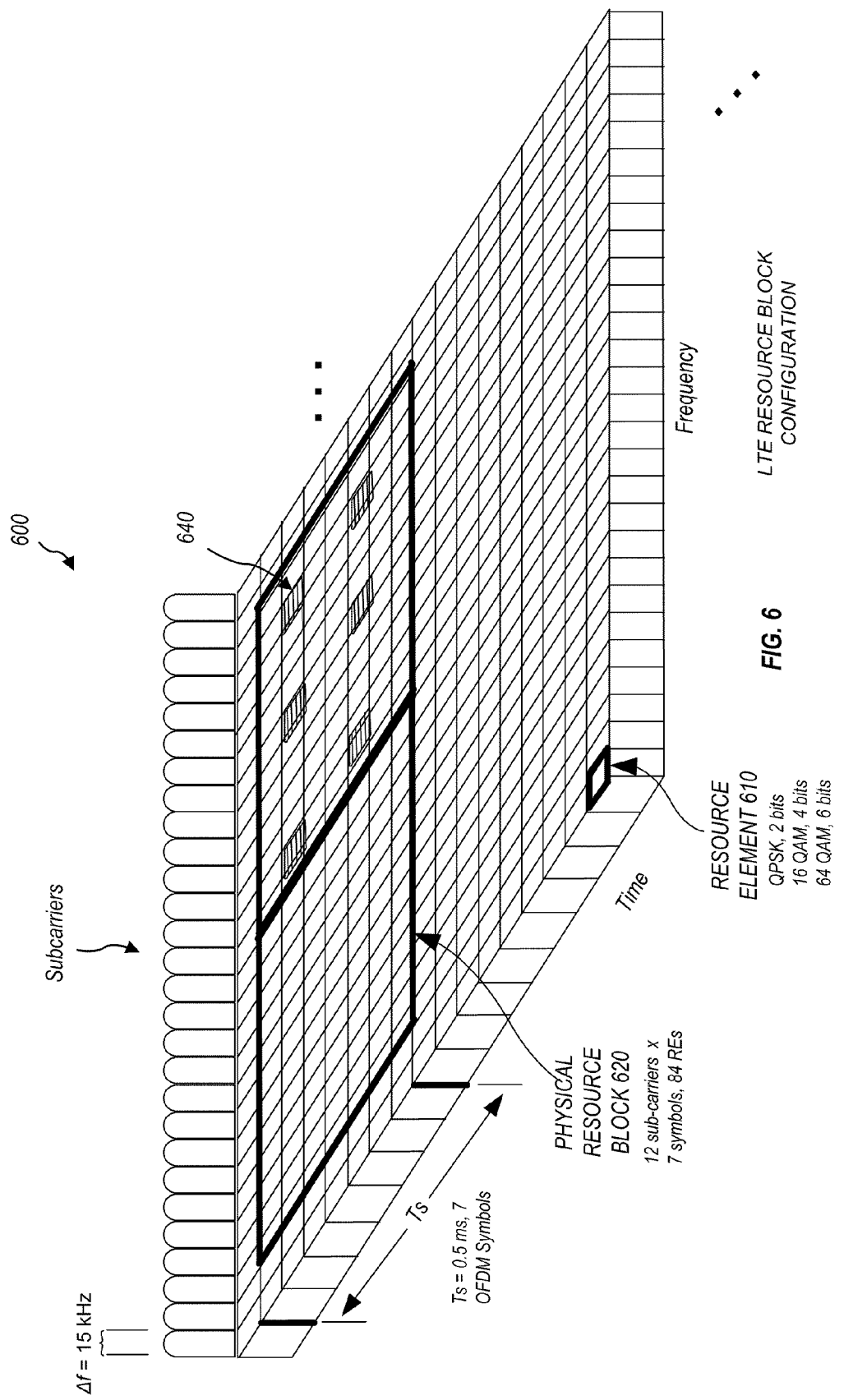
FIG. 6 illustrates resource block and spectrum configuration in a LTE system.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. An example RB in an LTE implementation is illustrated in FIG. 6. As is known in the art, resource blocks are comprised of time-frequency resource elements (also denoted here in as resource elements or "REs" for brevity), which may be defined by indices of time and frequency in a slot. Additional details of LTE RBs and REs are described in 3GPP TS 36.211. In LTE systems, the downlink includes many orthogonal sub-carriers within each resource block, spaced apart in frequency by, for example, 15 kHz. Resource block (RB) 620 is comprised of multiple resource elements (REs) 610 within a time slot. In the example shown, the time slot, Ts, has a duration of 0.5 ms, and includes 7 OFDM symbols. LTE defines reference signals and associated patterns, which may be allocated to resource elements in the RB and used as pilot signals. An example reference signal pattern is shown with respect to REs 640 arrayed as shown in FIG. 6.

RB 620 includes 12 subcarriers, each of 15 kHz bandwidth, thereby having a total bandwidth of 180 kHz. Consequently, the example RB comprises 84 REs in a 12×7 configuration. Reference signals within the pattern 640 may be used as pilot signals, and as such are different from pilot signaling used in 3G networks.

UMTS LTE supports scalable carrier bandwidths from 20 MHz down to 1.4 MHZ. In LTE, an RB is defined as 12 sub-carriers when the sub-carrier bandwidth is 15 kHz, or 24 sub-carriers when the sub-carrier bandwidth is 7.5 kHz. In an example implementation, in the time domain there is a defined radio frame that is 10 ms long and consists of 10 sub frames of 1 ms each. Every sub frame consists of 2 slots, where each slot is 0.5 ms. The subcarrier spacing in the frequency domain in this case is 15 kHz. Twelve of these subcarriers together (per slot) constitutes an RB, so in this implementation one resource block is 180 kHz. Six resource blocks fit in a carrier of 1.4 MHz and 100 resource blocks fit in a carrier of 20 MHz. Allocations of these resources to various UEs is typically performed in the HNB or HeNB.

In the downlink there are three main physical channels. The Physical Downlink Shared Channel (PDSCH) is used for the data transmission, the Physical Multicast Channel (PMCH) is used for broadcast transmission using a Single Frequency Network, and the Physical Broadcast Channel (PBCH) is used to send most important system information within the cell. Supported modulation formats on the PDSCH in LTE are QPSK, 16QAM and 64QAM.

In the uplink there are three physical channels. While the Physical Random Access Channel (PRACH) is only used for initial access and when the UE is not uplink synchronized, the data is sent on the Physical Uplink Shared Channel (PUSCH). If there is no data to be transmitted on Uplink for a UE, control information would be transmitted on the Physical Uplink Control Channel (PUCCH). Supported modulation formats on the uplink data channel are QPSK, 16QAM and 64QAM.

If virtual MIMO/Spatial division multiple access (SDMA) is introduced the data rate in the uplink direction can be increased depending on the number of antennas at the base station. With this technology more than one mobile can reuse the same resources. For MIMO operation, a distinction is made between single user MIMO, for enhancing one user's data throughput, and multi user MIMO for enhancing the cell throughput.

Figure 7:
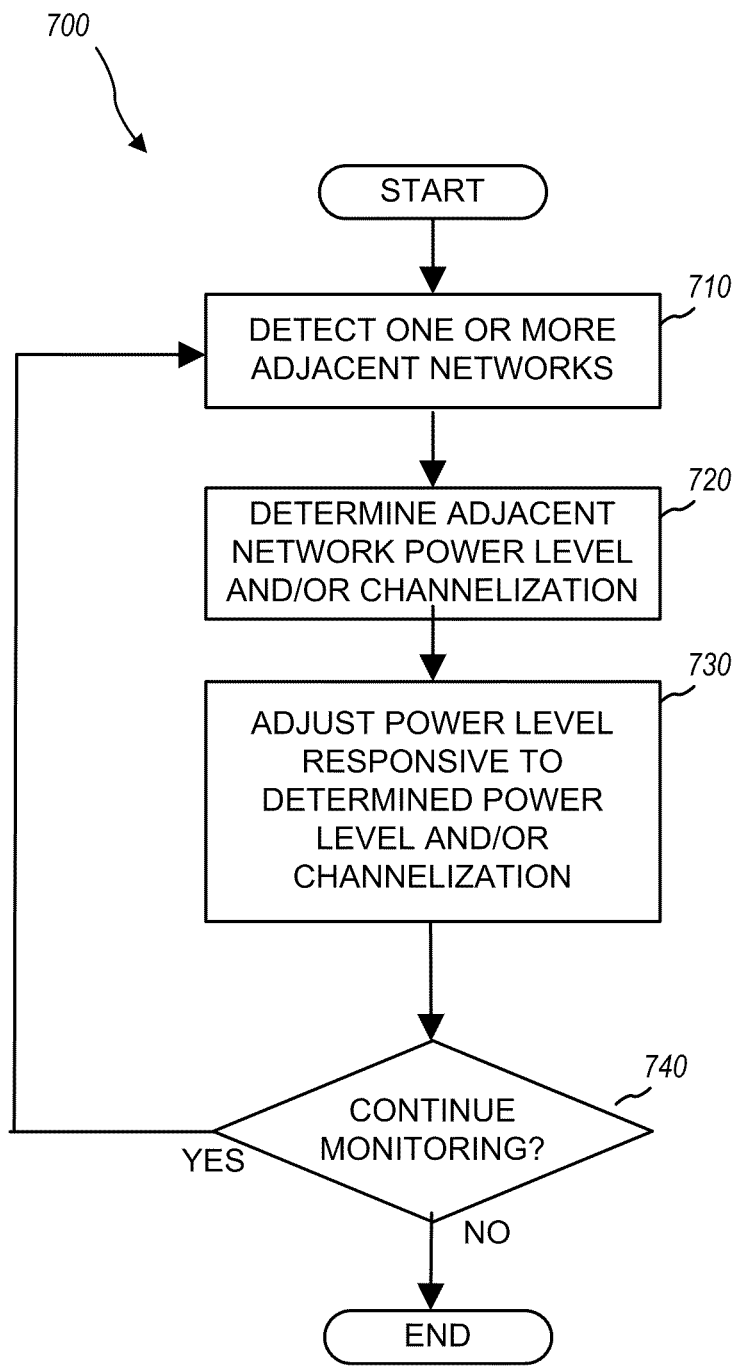
FIG. 7 illustrates a process for adjacent channel interference mitigation.

In a typical embodiment, an HeNB adjusts an output power level in response to detection of adjacent networks. This processing typically includes detecting one or more adjacent networks, determining a power level or power metric of at least one signal received on at least one channel of a plurality of adjacent channels being used by the adjacent wireless network where the adjacent network is a first or a second network type, and adjusting, responsive to the determined received signal power and/or adjacent network type or types, the output power of the HeNB so as to minimize interference to the adjacent channels. FIG. 7 illustrates an embodiment of a process 700 for implementing such power level adjustment. This processing may be done by signal processing hardware and/or software elements, such as those shown in FIG. 2, in a femtocell node such as a HeNB. The node may include software, in memory and/or in a computer program product, that is stored or included in the HeNB to implement power level determination and processing. At stage 710, a node, such as an HeNB, detects one or more adjacent networks operating on one or more channels (typically a plurality of channels). The adjacent networks may be other femtocells, macrocells or other networks and may be operating in UTRA configurations, E-UTRA configurations, or other network configurations. The power level on the adjacent channel or channels, typically based on a determined power level metric, may be determined at stage 720. In addition to power level, adjacent channel frequency/bandwidth configuration, such as use of particular subcarriers or sub-bands, as well as overall power level or subcarrier power levels (such as pilot signals carried on subcarriers) may be determined and used in a power level metric. Processing in stage 720 may also include processing to determine the adjacent network or networks' type and configuration, which may be used in simultaneous and/or subsequent processing.

At stage 730, the node may then adjust and/or control adjustment of overall power level and/or subchannel(s) power level so as to reduce or limit interference with the adjacent channel or channels. Power level adjustment may be done in conjunction with transmit elements in the node and/or may be done via control instructions provided to UEs or other elements in communication with the node.

The power adjustment may be done in a variety of ways in various embodiments. For example, the output power may be limited to an average or peak value that is less than a predefined or dynamically determined or adjusted maximum value. In some implementations, the power level limitations may be based on a functional relationship with the adjacent channel power levels determined at stage 720. For example, in one implementation, the power level may be reduced inversely proportional to the adjacent channel power (i.e., when the adjacent power level is high, the reduction may be small, whereas when the adjacent power level is low, the reduction may be large).

In various implementations, the power determination of the adjacent channel may be based on particular components or subcarriers of the adjacent channel signal, which may correspondingly be based on the adjacent network type. For example, the received power may be determined based on a particular subcarrier or signal in the adjacent channel, such as a pilot signal, with the determined power based on a measurement of the pilot signal. The pilot signal may be a pilot signal in a dedicated or allocated pilot sub-channel of the adjacent channel. For example, reference signals, as are defined with respect to LTE, may be used as a pilot signal and processed to determine power level. In UTRA implementations, alternate pilot signals are used and these may be used to determine adjacent network power metrics and levels.

In some implementations, an average or peak power level measurement may be made on the adjacent channel signal. This may be, for example, a power density determination made on the adjacent channel signal. Other power determinations may also be used and/or combined with those described above. For example, in one implementation, a power density measurement may be combined with a peak determination or pilot signal determination to generate a power level metric for use in stage 720.

In some implementations, the received signal power level metric may be based on a Reference Signal Received Power (RSRP) per resource element, with the determining including determining the Reference Signal Received Power per resource element by measuring, at the node, a Reference Signal transmitted on one of the adjacent channels. In addition, the RSRP may be based on the average of RSRP per resource element across multiple transmit antennas, such as in a MIMO system.

In WCDMA (UTRA Networks) transmit power spectral density (PSD) is uniform across the bandwidth, and hence the received interference is also roughly flat (except for the variation due to frequency selective channels). However, this is not the case in LTE, due to the use of OFDMA and SC-FDMA. Consequently in some embodiments, frequency division (FDM) partitioning may be used within a single carrier deployment to mitigate interference for HeNBs.

Figure 8:
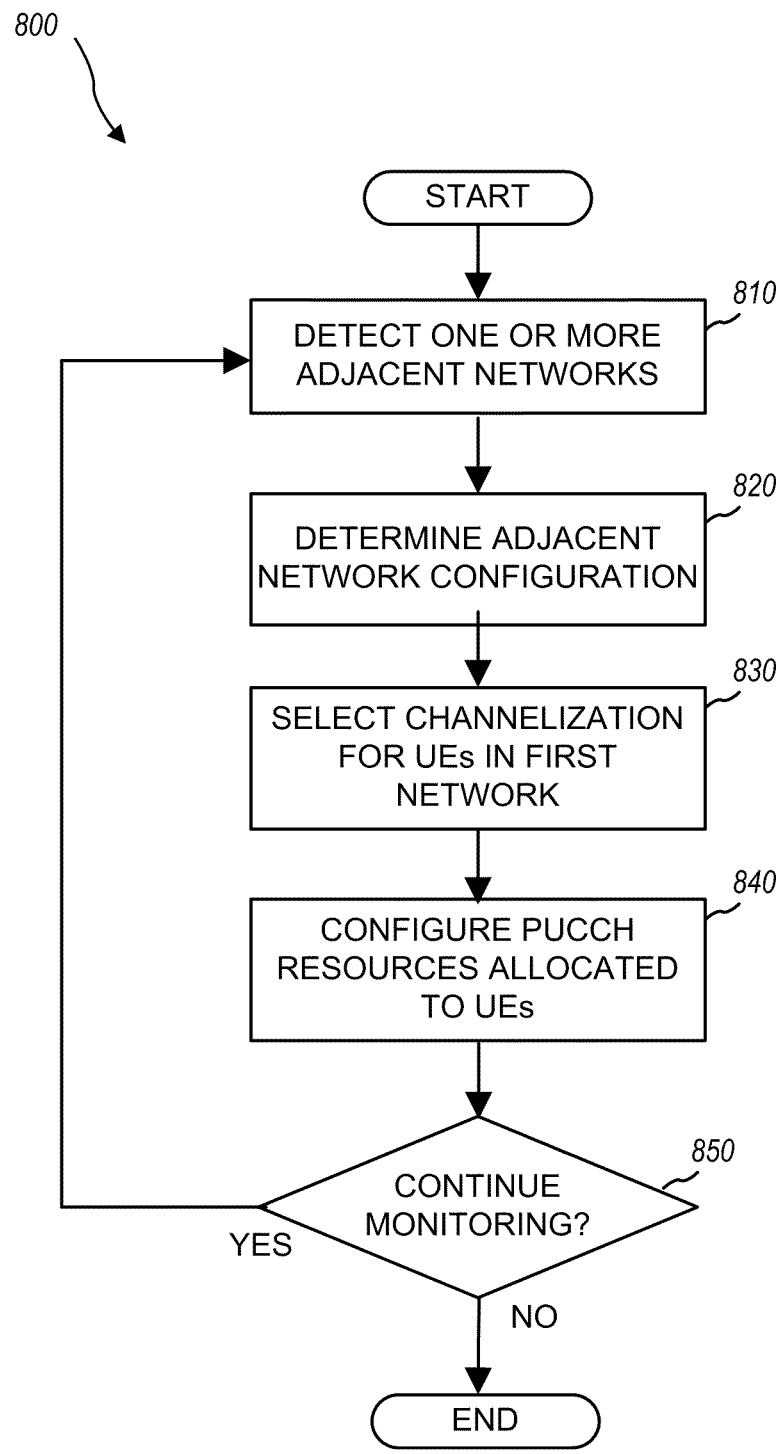
FIG. 8 illustrates a process for adjacent channel interference mitigation by configuration PUCCH resources.

As one example implementation, on the uplink, the control channels of different UEs may be orthogonalized by properly configuring the PUCCH resources allocated to the HeNB UEs. An example of how this may be implemented is illustrated in process 800 as shown in FIG. 8. Process 800 may begin with a start step wherein a first HeNB (or, in some implementations, other network elements such as eNBs, etc.) is configured. The first HeNB may be connected to one or more active UEs or may not be connected to any active UEs.

At step 810, the first HeNB detects the presence of a second network. This may be an adjacent or overlapping HeNB, HNB, macrocell, and/or other network. After detection of the adjacent network, channel utilization and power used in the second network may be determined at step 820. This may be done by, for example, determining uplink control channels of UEs operating within the second network and/or by other means. During or after detection of the second network, power level used in the femtocell and/or channels used may be selected at step 830, based on parameters of the second network, such as the second network's power level and/or channel or bandwidth usage.

In response to detection of the second network and determination of its channelization, The PUCCH resources allocated to UEs operating in the first HeNB may be configured at step 840 so as to provided orthogonalized uplink control channels with respect to the second network.

A decision step 850 may be performed to assess whether to continue monitoring for further addition of other networks (and/or removal or changes in power levels and/or channelization of adjacent networks). If continued monitoring is selected, the process may return to step 820 to detect additional or presence of more networks, after which process steps 820 through 850 may be repeated for the additional network(s). In some implementations process 800 may be repeated continuously without execution of decision step 850. In addition, in some implementations, process 800 may be further configured to reassess channel allocations at step 830 based on removal of adjacent networks.

Orthogonalization may be done in several ways. In one exemplary implementation, an HeNB performs orthogonalization by monitoring resource assignments from the macro PCCH and selects an orthogonal signal based on this monitoring.

In another implementation, orthogonalization selection and control comes from a control entity. This may be a HeNB management server (HEMS), which it typically located in a carrier's telecommunication facility or OAM.

In another implementation, HeNBs select orthogonal channels which are generally in a group, however, the communications are typically pairwise.

In one implementation, orthogonalization may be done by determining a set of control channels in the adjacent carrier bandwidth and allocating a second set of control channels in the HeNB such that the second set is selected to be orthogonal to the first set. The control channels may be uplink control channels.

The nature of interference seen in a WCDMA system is also very different from that in LTE. For example, in WCDMA a wideband C-PICH is transmitted all the time by an HNB, even in idle mode. This power, for example, is 10 dB below the total transmit power; and therefore an HNB without any active UEs causes less interference compared to an active HNB. However, this may not be the case for HeNBs. A HeNB without active UEs needs to transmit signals such as the PSS, SSS and common RS, which typically have comparable p.s.d.'s to the data (PDSCH) transmissions.

In a synchronous system, the SSS locations overlap and the CRS locations may overlap. In such a case, the impact of the interference conditions from a HeNB without active UEs is not very different from one with active UEs. This in turn would affect system-level performance in a different fashion than with HNBs.

In general it is very important that femtocells should not impact neighboring channels and carriers, especially if those carriers are owned by a different operator. For this reason, there are transmit power limitations specified for HNBs that sense the presence of NodeBs on an adjacent carrier.

In the case of HeNBs, the requirements for interference mitigation may be chosen differently from those of HNBs, while taking into account the different types of interference conditions described previously, including power and bandwidth usage differences. For example, in one exemplary implementation, an HeNB should detect the presence of both LTE and WCDMA carriers used by other operators on neighboring carriers, and choose its power level accordingly, as shown in the example process 700 of FIG. 7.

In addition, other techniques in addition to or in place of power control and power limitations may be used for some HeNB implementations. In one design, power shaping using a low-pass filter may be used so that lower power is used on the edge of the band as compared to the center of the band. This may aid in reducing adjacent channel interference (ACI). This may be done by, for example, filtering the output transmit signal at the band edges or in critical bandwidths within the channel so as to minimize interference in those frequencies. However, the filter should preferably be chosen such that it is transparent to the UE (and just appears as multi-path to the UE).

Figure 9A:
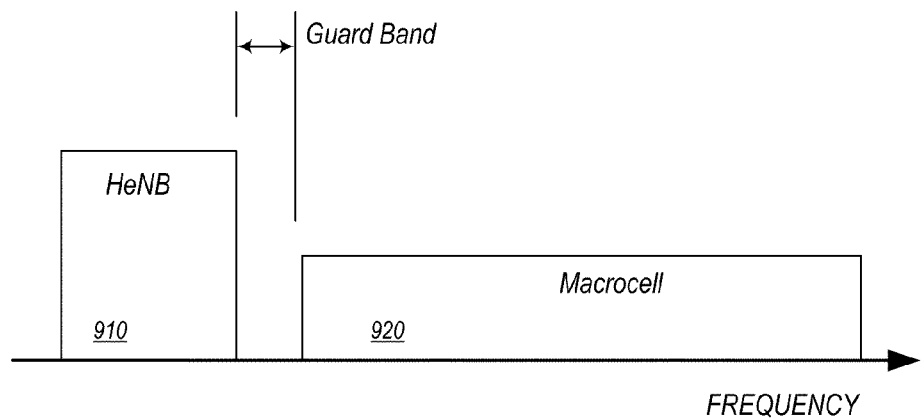
FIG. 9A illustrates frequency allocations for an example communication device operating adjacent to a macrocell.
Figure 9B:
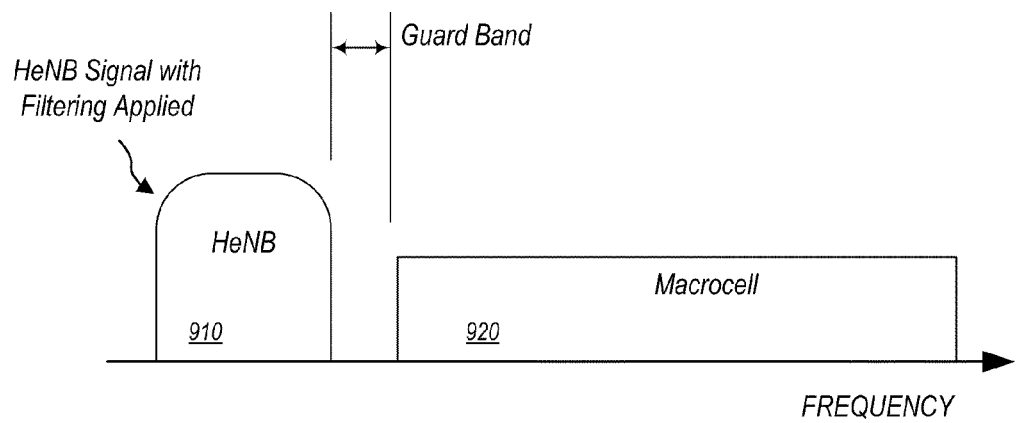
FIG. 9B illustrates bandwidth after a filtering operation for the communication device as described with respect to FIG. 9A.

FIGS. 9A and 9B illustrate details of signaling with one implementation. In FIG. 9A, an HeNB is operating in a band 910 close to an adjacent channel operating in a band 920. A narrow guard band, 930, is between band 910 and 920. Signal energy may spill over from the signal in HeNB band 910 to 920 and/or may overlap in the receiver signal processing, causing interference.

To mitigate this, the HeNB may detect the adjacent network and its characteristics, such as power and/or bandwidth, such as is described previously herein, and then filter the output of the HeNB as shown in FIG. 9B. The filtering may be done so as to symmetrically narrow the overall bandwidth as shown in FIG. 9B and/or may include filtering and/or shifting the transmitted signal in a non-symmetric fashion (not shown).

In one implementation, the filtering may be done using CDD techniques. In particular, CDD may be used to provide multiple time-delayed versions of a transmitted signal, which can be viewed, in effect, as a lowpass filter of the transmitted signal when seen from the receiver/UE.

In addition to power reduction and filtering, in another design, the HeNB may detect the adjacent channel signal and adjust or limit its bandwidth. The adjacent channel signal may be operating in a bandwidth that overlaps that of the HeNB or may be in a bandwidth close to that use by the HeNB.

Figure 10A:
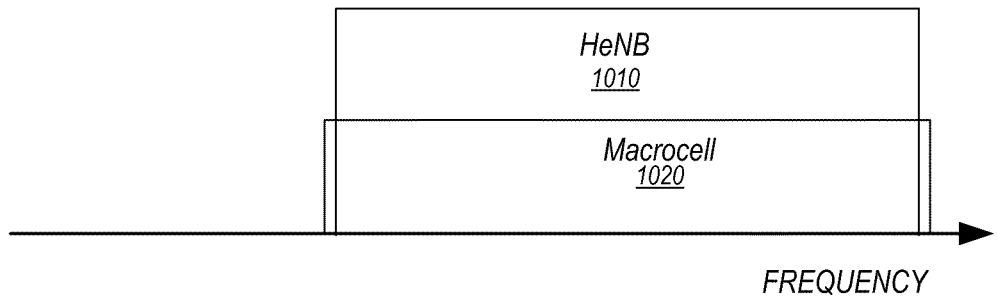
FIG. 10A illustrates bandwidth shared between an HeNB and a macrocell in a wireless communications system.

FIG. 10A illustrates one configuration where the HeNB is operating at a relatively high power level in a band 1010 overlapping all or a portion of the band 1020 used by the adjacent channel (such as, for example, a macrocell band). In various implementations, the adjacent channel signal may be in a macrocell, microcell, picocell, femtocell or other wireless network configuration.

In LTE, bandwidth is allocated in resource blocks as shown in FIG. 3, and these can be limited to widths of 12 subcarriers per resource block. The HeNB generally controls these frequency allocations, and can therefore select subcarriers within the available bandwidth so as to mitigate interference.

Figure 10B:
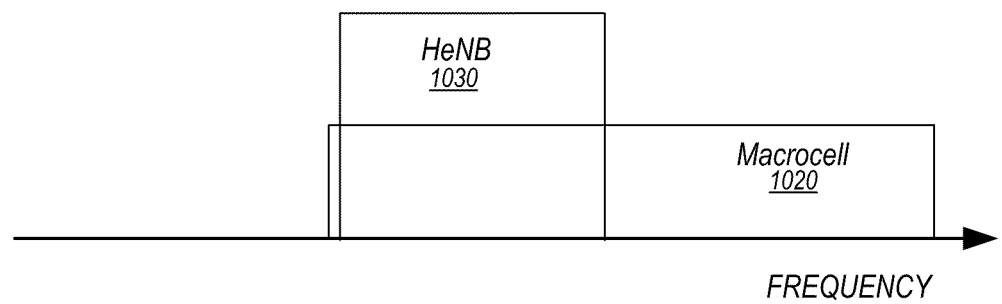
FIG. 10B illustrates one implementation of bandwidth adjustment.

FIG. 10B illustrates a frequency adjusted HeNB transmit signal to mitigation interference. In the example shown in FIG. 10B, the bandwidth adjusted signal may occupy a band 1030 that is offset (or centered, not shown) with regard to band 1020.

Figure 10C:
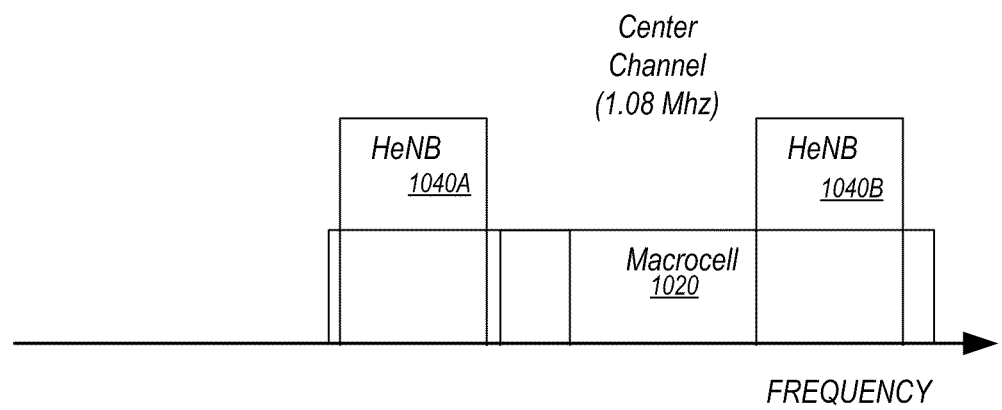
FIG. 10C illustrates another implementation of bandwidth adjustment.

FIG. 10C illustrates another frequency adjusted HeNB transmit signal to mitigate interference. In FIG. 10C, the HeNB transmit signal may occupy a band 1040 (which may be contiguous or may include non-contiguous bands 1040A and 1040B as shown in FIG. 10C). In some embodiments, it may be particularly important to adjust the HeNB signal so as to avoid interference in channels of importance in the adjacent network, such as a 1.08 MHz center channel (or other important channels that are not shown).

Figure 11:
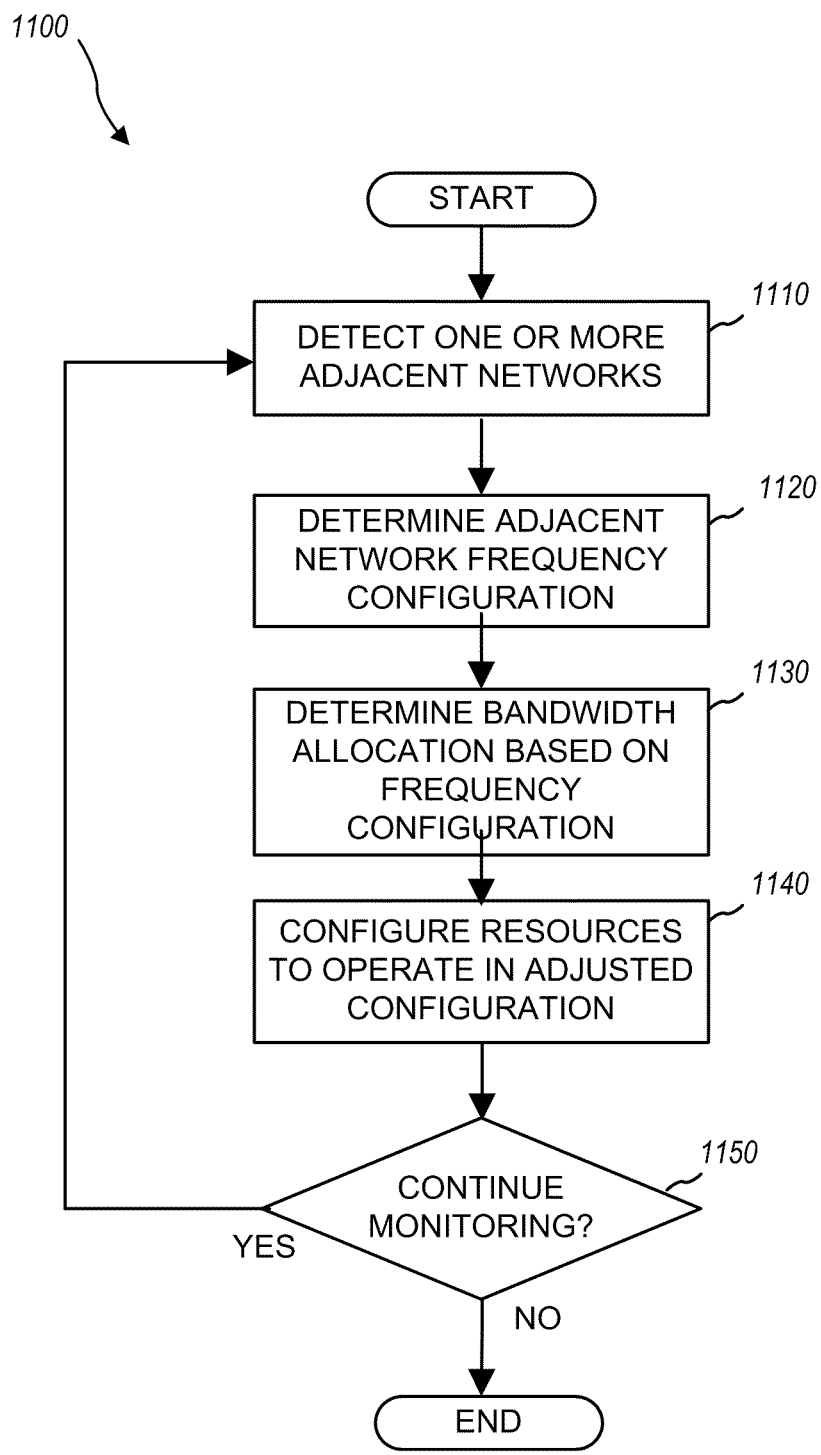
FIG. 11 illustrates a process for adjusting bandwidth to mitigate interference in a wireless communications system.

An example of a bandwidth selection process 1100 consistent with this approach is shown in FIG. 11. Process 1100 may be used in an HeNB to adjust transmit signals to mitigate interference with adjacent channels. At stage 1110, adjacent channel(s) and associated network(s) are detected. Once detected, adjacent channel frequency allocations (as well as power usage as described previously) may be determined at stage 1120. Based on this determination, an adjusted bandwidth allocation may be determined at stage 1130. At stage 1140, resources may be configured to operate in the adjusted configuration. This may include, for example, allocating resource blocks at the HeNB so as to avoid part of the adjacent channel band, either at the HeNB or at an HEMS, OAM or other carrier element. Process 110 may be repeated periodically or asynchronously at stage 1150.

In one implementation, bandwidth adjustment may be done by limiting either the total bandwidth used or the PDSCH usage to a fraction of the total available bandwidth. The HeNB may then operate by occupying a fraction of the bandwidth away from the edge of the band so as to limit adjacent channel interference or to avoid important channels or bands used by the adjacent carrier.

In some implementations, a different guard profile may be designed for HeNBs, with the bits used to indicate the bandwidth on PBCH and thus be interpreted differently for HeNBs and regular eNBs.

In another design, the rules for the bandwidth and power levels of different HeNBs may be selected so at to be different from those for eNBs. For example, an HeNB may detect the presence of a signal (e.g. CPICH or CRS) on a neighboring carrier and then reduce its power, bandwidth or a combination of both.

In one implementation, bandwidth allocation may be compared to using the entire bandwidth, but using a lower power. If asymmetric bandwidths are used, the DL bandwidth may be reduced without reducing the uplink bandwidth.

In addition, partial bandwidth co-existence may also be used to combat interference conditions within a carrier. In such a case the bandwidth may be chosen to avoid critical control channels as shown in FIG. 10C (e.g. the central 1.08 MHz containing PSS/SSS, etc). The UE can be configured to know the interference conditions possibly caused by co-existence of HeNBs using different fractions of bandwidth. For example, it may weigh the modulation symbols received in the subcarriers with femtos differently from those without femtos. New UE reports may be provided to differently report the interference conditions in each of these bandwidths.

In one configuration, the apparatus for wireless communication described herein include means for performing various functions as are described herein. In one aspect, the aforementioned means may be a processor or processors and associated memory in which embodiments of the invention reside, such as are shown in FIG. 2, and which are configured to perform the functions recited by the aforementioned means. In another aspect, the aforementioned means may be a module or any apparatus configured to perform the functions recited by the aforementioned means. These may be, for example, modules or apparatus residing in HeNBs, APs, UEs and/or ATs as are shown in FIG. 1 and FIGS. 3 through 5.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media.

Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It should be understood that the techniques described in detail above for HeNBs may be applied to other types of cells (e.g. pico cells) without departing from the scope of the present disclosure. It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

It is intended that the following claims and their equivalents define the scope of the invention.

We claim:

1. A method for minimizing adjacent channel interference, comprising:
    determining, at a node of a wireless network, a power level of at least one signal received on at least one channel of a plurality of adjacent channels, wherein the plurality of adjacent channels are used by an adjacent wireless network of a first network type or by an adjacent wireless network of a second network type;
    determining a network type of the network associated with the adjacent channel; and
    adjusting, responsive to the determined power level, an output power of the node based at least in part on the determined network type.

2. The method of claim 1 wherein the first network type comprises a Universal Terrestrial Radio Access (UTRA) network and the second network type comprises an Evolved Universal Terrestrial Radio Access (E-UTRA) network.

3. The method of claim 1 wherein the power level comprises measured power of a predefined signal.

4. The method of claim 1 wherein the adjusting comprises limiting the output power to less than a predefined maximum output power.

5. The method of claim 1 wherein the power level comprises a measured pilot power and the determining a power level comprises determining the measured pilot power by measuring a power of a common pilot channel transmitted on at least one of the adjacent channels.

6. The method of claim 5 wherein the determining a power level comprised measuring, at the node, a total received power density and the adjusting comprises reducing the output power based upon a relationship between the measured pilot power and the total received power density.

7. The method of claim 6 wherein the power level comprises a code power of a primary common pilot channel (CPICH) signal transmitted on at least one of the adjacent channels.

8. The method of claim 1 wherein the power level comprises a Reference Signal Received Power per resource element and the determining a power level comprises determining the Reference Signal Received Power per resource element by measuring, at the node, a Reference Signal transmitted on one of the adjacent channels.

9. The method of claim 8, wherein the Reference Signal Received Power per resource element comprises an average of multiple Reference Signal Received Power per resource element values over multiple transmit antennas.

10. The method of claim 8 wherein the determining a power level comprises measuring, at the node, a total received power density and the adjusting comprises reducing the output power based upon a relationship between the Reference Signal Received Power per resource element and the total received power density.

11. The method of claim 1 wherein the node comprises a plurality of transmit antennas, the output power comprising a sum of power transmitted by the plurality of transmit antennas.

12. The method of claim 1 wherein the node is a Home eNodeB (HeNB) or a femto node.

13. The method of claim 1 wherein the adjacent wireless network of the first network type comprises at least one of a macrocell, microcell, picocell, relay and femtocell.

14. A femto node, comprising:
a signal power determiner configured to determine a power level of at least one signal received on at least one channel of a plurality of adjacent channels, wherein the plurality of adjacent channels are used by an adjacent wireless network of a first network type or by an adjacent wireless network of a second network type, and to determine a network type of the network associated with the adjacent channel; and
a transmit power controller configured to adjust, responsive to the determined power level and based at least in part on the determined network type, an output power of the femto node.

15. The femto node of claim 14 wherein the first network type comprises a Universal Terrestrial Radio Access (UTRA) network and the second network type comprises an Evolved Universal Terrestrial Radio Access (E-UTRA) network.

16. The femto node of claim 15 wherein the power level comprises measured power of a predefined signal.

17. The femto node of claim 14 wherein the power level comprises a measured pilot power and wherein the signal power determiner is further configured to determine the measured pilot power by measuring a power of a common pilot channel transmitted on at least one of the adjacent channels.

18. The femto node of claim 17 wherein the signal power determiner is configured to measure a total received power density and wherein the transmit power controller is configured to reduce the output power based upon a relationship between the measured pilot power and the total received power density.

19. The femto node of claim 18 wherein the measured pilot power comprises a code power of a primary CPICH signal transmitted on at least one of the adjacent channels.

20. The femto node of claim 14 further comprising a plurality of transmit antennas wherein the output power comprises a sum of power transmitted by the plurality of transmit antennas.

21. The femto node of claim 14 wherein the signal power determiner comprises a first circuit configured to determine a power level of a third generation (3G) received signal and a second circuit configured to determine a power level of a fourth generation (4G) signal.

22. A femto node, comprising:
means for determining a power level of at least one signal received on at least one channel of a plurality of adjacent channels, wherein the plurality of adjacent channels are used by an adjacent wireless network of a first network type or by an adjacent wireless network of a second network type;
means for determining a network type of the network associated with the adjacent channel; and
means for adjusting, responsive to the determined power level, an output power of the femto node based at least in part on the determined network type.

23. The femto node of claim 22 wherein the first network type comprises a Universal Terrestrial Radio Access (UTRA) network and the second network type comprises an Evolved Universal Terrestrial Radio Access (E-UTRA) network.

24. The femto node of claim 22 wherein the power level comprises measured power of a predefined signal.

25. The femto node of claim 22 wherein the power level comprises a measured pilot power and the means for determining the power level comprises means for measuring a power of a common pilot channel transmitted on at least one of the adjacent channels.

26. The femto node of claim 25 wherein the means for determining a power level comprises means for measuring a total received power density and the means for adjusting comprises means for reducing the output power based upon a relationship between the measured pilot power and the total received power density.

27. The femto node of claim 26 wherein the measured pilot power comprises a code power of a primary CPICH signal transmitted on at least one of the adjacent channels.

28. The femto node of claim 22 wherein the means for determining a power level comprise means for determining a power level of a third generation (3G) received signal and means for determining a power level of a fourth generation (4G) signal.

29. A computer program product comprising a non-transitory computer-readable medium comprising:
codes for causing a computer to:
determine at a node of a wireless network, a power level of at least one signal received on at least one channel of a plurality of adjacent channels, wherein the plurality of adjacent channels are used by an adjacent wireless network of a first network type or by an adjacent wireless network of a second network type;
determine a network type of the network associated with the adjacent channel; and
adjust, responsive to the determined power level, an output power of the node based at least in part on the determined network type.

30. The computer program product of claim 29 wherein the first network type comprises a Universal Terrestrial Radio Access (UTRA) network and the second network type comprises an Evolved Universal Terrestrial Radio Access (E-UTRA) network.

31. The computer program product of claim 29 wherein the codes for causing the computer to adjust the output power comprise codes for causing the computer to reduce the output power to be less than a predefined maximum output power.

32. The computer program product of claim 29, wherein the power level comprises a measured pilot power and the codes for causing the computer to sense the received signal power comprise codes for causing the computer to determine the measured pilot power by measuring of a power of a common pilot channel transmitted on at least one of the adjacent channels.

33. The computer program product of claim 32, wherein the codes for causing the computer to adjust the output power comprise codes for causing the computer to measure a total received power density and reduce the output power based upon a relationship between the measured pilot power and the total received power density.

34. The computer program product of claim 33 wherein the received signal power comprises a code power of a primary CPICH signal transmitted on at least one of the adjacent channels.

35. The computer program product of claim 29, wherein the power level comprises a Reference Signal Received Power per resource element and the codes for causing the computer to sense the received signal power comprise codes for causing the computer to determine the Reference Signal Received Power per resource element by measuring a Reference Signal transmitted on one of the adjacent channels.

36. The computer program product of claim 35, wherein the codes for causing the computer to determine a power level comprise codes for causing the computer to measure a total received power density and wherein the codes for causing the computer to adjust the output power comprise codes for causing the computer to reduce the output power based upon a relationship between the Reference Signal Received Power per resource element and the total received power density.

37. The computer program product of claim 29 wherein the codes comprise codes for determining a power level of a third generation (3G) received signal and codes for determining a power level of a fourth generation (4G) signal.

38. An apparatus for use in a communications device, comprising: a memory; and
    a processor coupled to the memory, the processor configured to execute instructions stored in the memory to:
    determine at a node of a wireless network, a power level of at least one signal received on at least one channel of a plurality of adjacent channels, wherein the plurality of adjacent channels are used by an adjacent wireless network of a first network type or by an adjacent wireless network of a second network type;
    determine a network type of the network associated with the adjacent channel; and;
    adjust, responsive to the determined power level, an output power of the node based at least in part on the determined network type.

* * * * *